UNITED STATES PATENT OFFICE.

AUGUST J. METZLER, OF BROOKLYN, ASSIGNOR TO C. C. PUFFER, OF ROCHESTER, NEW YORK.

PROCESS OF PREPARING RUH-BEER FOR MARKET.

SPECIFICATION forming part of Letters Patent No. 436,537, dated September 16, 1890.

Application filed December 31, 1888. Serial No. 295,077. (No specimens.)

*To all whom it may concern:*

Be it known that I, AUGUST J. METZLER, a citizen of the United States, residing at Brooklyn, county of Kings, State of New York, have invented a certain new and useful Improvement in the Process of Preparing Ruh-Beer for Market; and I declare the following to be a full, clear, and exact description of the invention, such as will enable others skilled in the art to which it pertains to make and use the same.

My invention has for its purpose to cheapen and simplify the preparation of the ruh-beer for the market.

The prior state of the art in the preparation of ruh-beer for the market may be briefly stated as follows: The beer is brought by any process to its aged or ripened condition in the ruh-casks, and by its "aged or ripened condition" I mean that state where the brewer proceeds to finish it off for the market. It has then been customary to bung up the ruh-casks and permit after a long period the slow, incipient, and almost imperceptible fermentation to accumulate a sufficient pressure to enliven the beer for the market; or, in recent years it has been customary to draw off the ripened ruh-beer into shavings-casks. Here a proportion of young beer known as "kraeusen" was added. This excited an active fermentation. Sooner or later finings were added and the casks were bunged up, an enlivening pressure was quickly accumulated, and in a few days the beer was ready for the market. This latter process greatly shortened the time in which the ripened ruh-beer was prepared for the market; but it was at the expense of quality, for the addition to it of the young or kraeusen beer detracted to that extent from the aged or ripened characteristics of the beer.

My process will now be understood, and it relates to that stage in which ripened ruh-beer is finished off for the market. This I aim to accomplish without the use of the kraeusen or any foreign matter and without the necessity of shavings, and may or may not use finings, according as the same may appear to be necessary, to assist in clarifying the beer. To this end I take the ruh-beer which has been ripened by any process, and either in the same casks, or having drawn it off into other casks, I subject it to a vacuum of greater or less degree. This acts to abstract from it the air and deleterious gases. Having held it under the vacuum for a sufficient length of time to cause it to part with these constituents, it is ready to absorb again with avidity whatever gaseous matter may be presented. Now, while I hold the beer against the admission of air, I proceed to relieve the vacuum by the admission of carbonic-acid gas, which the beer rapidly absorbs, and having thus relieved the vacuum, I continue the admission of carbonic-acid gas until the pressure of gas has accumulated to the usual enlivening pressure, say seven to eight pounds.

I also, if the character of the ruh-beer demands it, add to the mass in the usual way any usual finings, and this may be added at any time before or during the vacuum or pressure treatment. So, also, the pressure may be, if desired, carried up to any degree, even greatly beyond an enlivening pressure, and then be let down to the usual pressure before racking off into kegs.

In order to gain all the advantages of the process in the way of economy of time, the ruh-beer should be made from the outset under a vacuum; but if the ruh-beer is already made and ripened by any other process the brewer may at any time subject the same to a vacuum and extract its air and free oxygen, after which the vacuum may be relieved by admitting carbonic-acid gas and the same finished for the market by accumulating a gas-pressure, as above explained.

The finings may be introduced in any convenient way. Thus the same may be put into a closed vessel communicating with the interior of the cask by a pipe with a valve in it. By opening the valve the contents will pass freely into the cask.

I would call attention to the fact that in an application, Serial No. 295,075, I describe and claim the use of gas in a somewhat similar manner in the manufacture of ruh-beer, and in my application Serial No. 295,076 I describe and claim the introduction of gas in connection with saccharine before it has excited fermentation in preparing ripened ruh-beer for the market. So, also, in my application Serial No. 295,074 I describe and claim the feature of relieving the vacuum by gas arising from fermentation due to the addition of saccharine to ripened ruh-beer.

What I claim is—

1. The within-described process for preparing ruh-beer for the market, the same consisting in first subjecting the ripened ruh-beer to the action of a partial vacuum, then relieving the vacuum by the introduction of carbonic-acid gas, and continuing the introduction until there is a gas-pressure sufficient to impart to the beer its desired life for the market, substantially as described.

2. The within-described process for preparing ruh-beer for the market, the same consisting in first subjecting the ripened ruh-beer to the action of a vacuum of greater or less degree, then relieving the vacuum by the introduction of carbonic-acid gas, and continuing the introduction until there is a gas-pressure sufficient to impart to the beer its desired life, and adding finings before or during the vacuum or pressure stages to assist in clarifying, substantially as described.

In testimony whereof I sign this specification in the presence of two witnesses.

AUGUST J. METZLER.

Witnesses:
WASH. L. JAQUES,
C. C. PUFFER.